E. R. KLEMM.
FRICTION CLUTCH MECHANISM.
APPLICATION FILED DEC. 16, 1907.
917,312.
Patented Apr. 6, 1909.
2 SHEETS—SHEET 1.
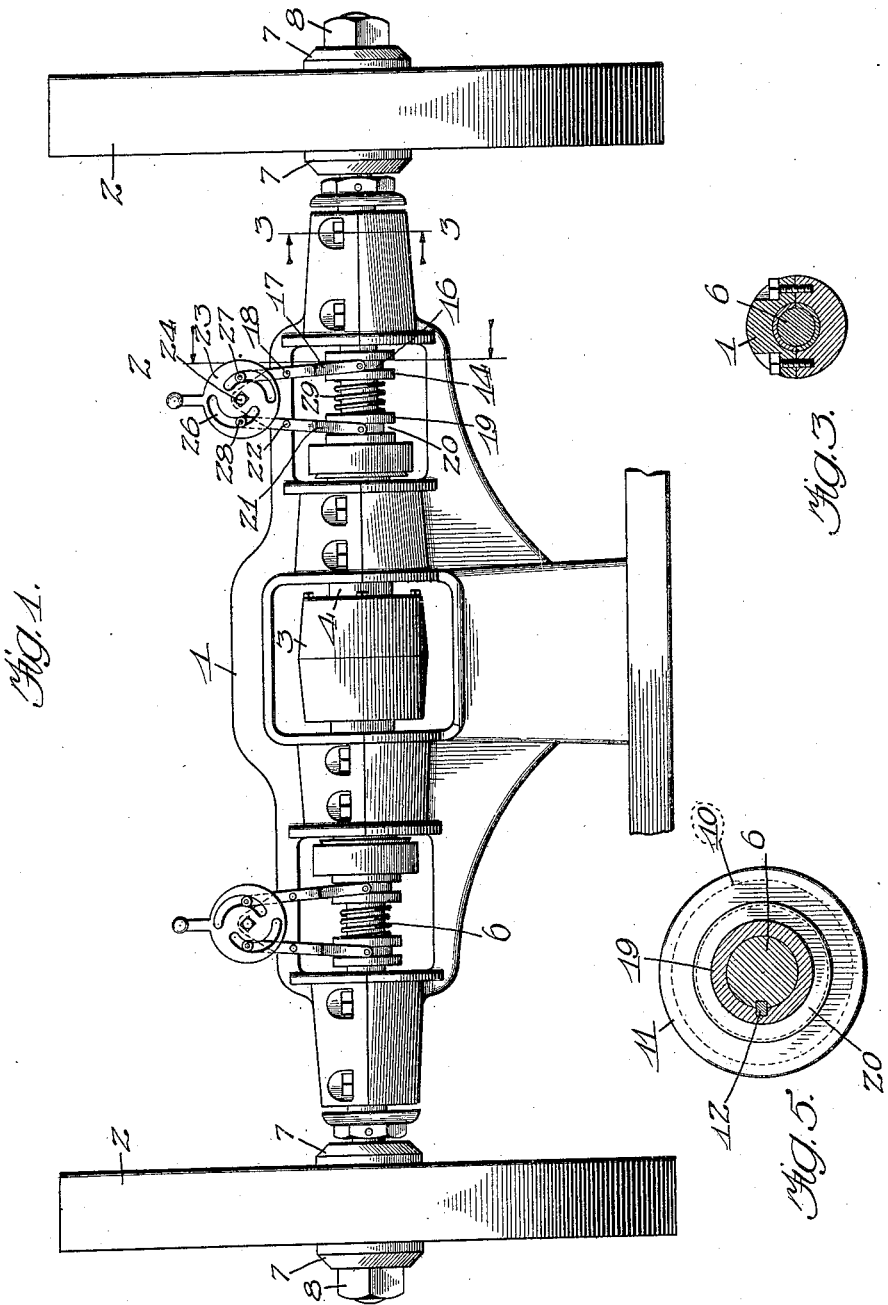

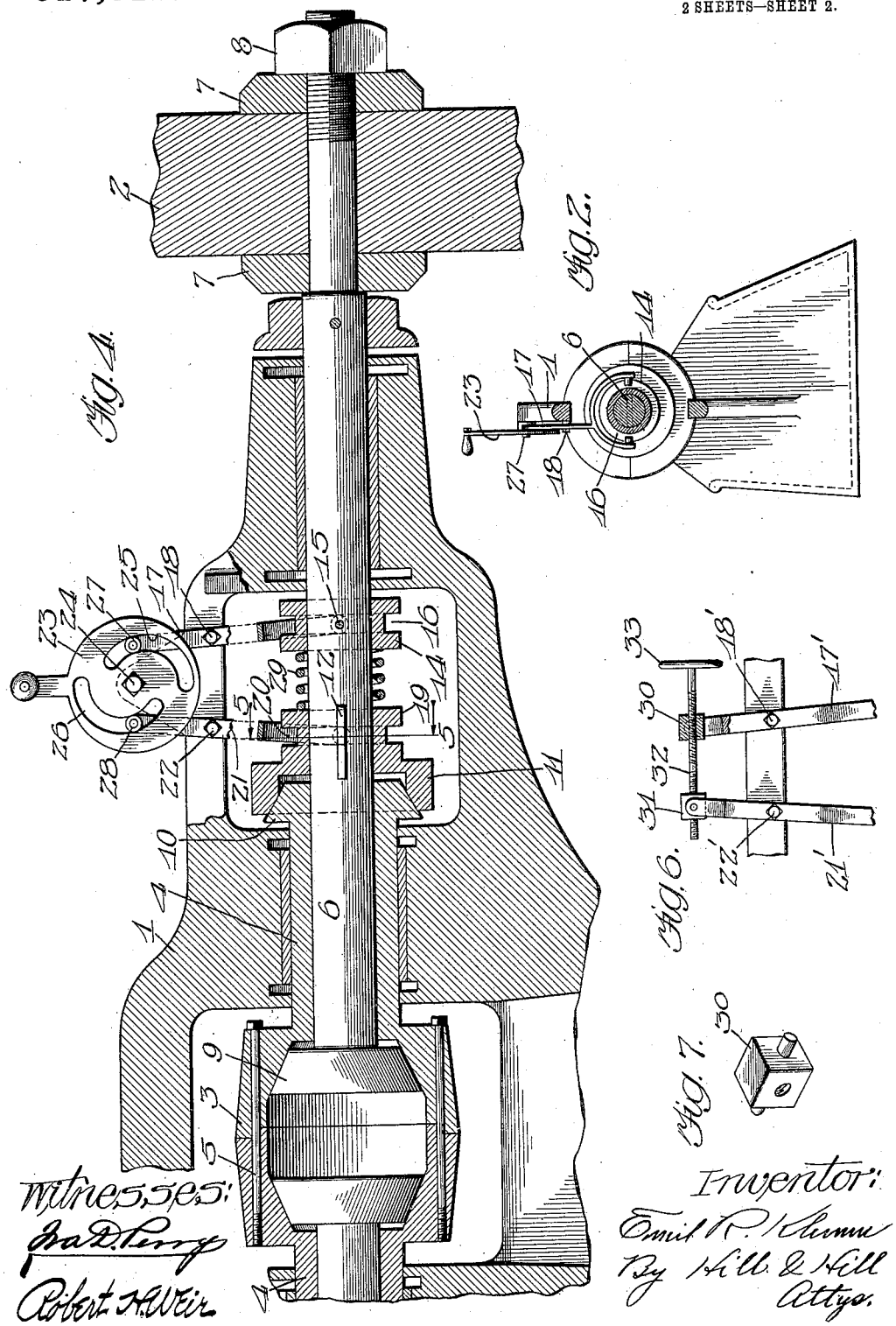

UNITED STATES PATENT OFFICE.

EMIL R. KLEMM, OF CHICAGO, ILLINOIS.

FRICTION CLUTCH MECHANISM.

No. 917,312.      Specification of Letters Patent.      Patented April 6, 1909.

Application filed December 16, 1907. Serial No. 406,662.

*To all whom it may concern:*

Be it known that I, EMIL R. KLEMM, a citizen of the United States, residing at Chicago, county of Cook, and State of Illinois, have invented certain new and useful Improvements in Friction Clutch Mechanism, of which the following is a description.

My invention relates to friction mechanism for connecting rotatable parts in axial alinement to each other and for accurately alining the part when so connected.

The object of my invention is, to provide a simple, durable and efficient device of the kind described, especially adapted for use upon high speed machines.

To this end my invention consists in the novel construction, arrangement and combination of parts, herein shown and described and more particularly pointed out in the claims.

In the accompanying drawings wherein like, or similar reference characters indicate like or corresponding parts: Figure 1, is an elevation of my device, applied to a polishing or grinding machine. Fig. 2, is a section taken substantially on line 2—2 of Fig. 1. Fig. 3, is a section taken substantially on line 3—3 of Fig. 1. Fig. 4, is an enlarged longitudinal vertical section of a portion of the machine shown in Fig. 1. Fig. 5, is a section taken substantially on line 5—5 of Fig. 4. Fig. 6, is an elevation of a slightly modified form of shifting mechanism for my device. Fig. 7, is a detail of a portion of the shifting mechanism shown in Fig. 6.

In the drawings my device is shown applied to a grinding or polishing machine in which 1, is a frame upon which is mounted suitable grinding or polishing wheels of any desired form or construction at its opposite sides.

A driver 3, is provided at a point substantially midway between the wheels, for driving the device. In the preferred construction shown, the driver consists of a suitable belt pulley provided on each side with an extended tubular bearing 4, arranged to be rotatably mounted in suitable journals in the frame 1. The interior opening in the driver is slightly larger at the pulley than the bore of the bearings 4, and each end of the enlarged portion of the bore is contracted or tapered toward the bearing and finished to form a friction surface. The driver 3 is preferably formed in two similar parts each comprising one-half of the driving pulley with a bearing attached thereto and secured together in any desired manner, as for example, by means of the bolts 5—5.

Each wheel is provided with a shaft 6, or equivalent means equipped at its outer end in any suitable manner to properly engage a grinding wheel or the like to rotate the same. In the form shown, the outer extremity of the shaft 6, is slightly reduced in diameter and provided with a pair of collars 7—7 adapted to fit upon the reduced portion of the shaft. A nut 8, is also provided in the usual manner, adapted to force the collars longitudinally of the shaft to clamp the wheel between them, the inner collar engaging with the shoulder upon the shaft to prevent its longitudinal movement when so employed. In the form shown, the inner end of each of the shafts 6, is provided with an enlarged conical portion 9, adapted to fit the tapering portion at one end of the interior of the pulley 3, so that by moving the shaft and pulley longitudinally of each other they may be frictionally engaged or disengaged as desired. In my preferred construction, also, the outer end of each bearing 4, is provided with an enlarged conical portion 10. A head 11, provided with a part adapted to coöperate with the conical portion 10 of the bearing is mounted upon the shaft 6, and adapted to be moved longitudinally thereon. A suitable feather 12, or equivalent means is provided to prevent rotation between the shaft 6, and the head 11.

Any suitable means may be provided to control the relative positions of the driver 3, the shaft 6, and head 11. As shown, the driver 3, is arranged to coöperate with the frame 1, to prevent its longitudinal movement in the frame and a collar 14 is rigidly secured to the shaft 6, by a pin 15 or other suitable means, and provided with a groove 16 or equivalent means, adapted to coöperate with a forked lever 17, pivotally mounted upon the frame 1 as at 18 to control the longitudinal position of the shaft and move the same as desired. The head 11, is provided with a projecting hub 19 having a groove 20 or other suitable means adapted to coöperate with a forked lever 21 pivotally mounted upon the frame as at 22 to control the position of the head.

Any suitable means may be employed to operate the levers 17 and 21. In the form shown, a disk 23 is rotatably mounted upon the frame as at 24, and provided with two similar spiral grooves 25—26 adapted to receive suitable lateral projections 27 and 28 upon the lever 17 and 21 respectively. The grooves are so formed that a partial rotation of the disk 23 will simultaneously move the parts 27 and 28 of the levers either toward or from each other as desired. Obviously as above described, longitudinal movement of the shaft 6 while the driver 3 is held stationary, will cause the frictional engagement of the part 9 upon the shaft with the walls of the recess in the driver, tending to rotatably lock the shaft to the driver. It is also obvious that the movement of the head 11 longitudinally of the shaft toward the conical part 10 will cause the head to frictionally engage the driver 10 and thus also tend to rotate the shaft 6 upon which the head 11 is mounted, it is thus evident that when the head and shaft are simultaneously moved in opposite directions longitudinally, so that each are frictionally engaged with their coöperating part, the shaft will be provided with two substantially independent frictional driving devices, thus producing an unusually strong and powerful movement. It is also evident that as the several conical parts are concentrically located upon their respective members and the recesses with which they coöperate are also concentrically located, the simultaneous engagement of the devices will accurately center the shaft and driver and materially assist in the smooth operation of the device.

In the preferred construction shown, a helical spring 29, is mounted upon the shaft 6 between the collar 14 and head 11 tending to force the same apart thus holding the shaft continuously in engagement with the driver. Also when the head 11 and collar 14 are moved toward each other this arrangement will increase the lateral friction between the lever 17 and 21 and their respective grooves 16 and 20, thus serving as a frictional brake to stop the rotation of the shaft 6 and hold the same stationary when it is not in engagement with the driver.

In the form shown, in Fig. 6, the disk 23 is dispensed with and the levers $17^1$ and $21^1$ are each provided with a swivel nut 30 and 31 respectively, in place of the lateral projection 27 and 28 and a rod 32 preferably having a portion threaded with a right hand thread, and the remainder with a left hand thread of suitable size and form to fit the nuts 30 and 31 is provided, so that by rotating the rod 32 the levers $17^1$ and $21^1$ are operated in substantially the same manner as where the disk 23 is employed. A hand wheel 33 or other suitable means is preferably provided upon the rod 32 to rotate the same.

Having thus described my improvement, it is obvious that various immaterial modifications may be made in my device without departing from the spirit of my invention, hence I do not wish to be understood as limiting myself to the exact form and construction shown.

What I claim as new and desire to secure by Letters Patent is:

1. In a device of the kind described, a frame, a rotatable driver mounted upon said frame, and a shaft rotatably mounted jointly upon said frame and driver concentrically with said driver, in combination with an enlarged conical part upon said shaft adapted to coöperate with a conical recess formed in said driver to rotatably lock said shaft and driver together.

2. In a device of the kind described, a frame, a rotatable driver mounted upon said frame, and provided with a chamber intermediate its ends, and a shaft rotatably mounted jointly upon said frame and driver concentrically with said driver, in combination with an enlarged conical part provided upon said shaft and positioned within said chamber, and adapted to coöperate with the peripheral walls thereof to rotatably lock said shaft and driver together.

3. In a device of the kind described, a frame, a rotatable driver mounted upon said frame, and a plurality of shafts rotatably mounted concentrically with said driver, in combination with a conical part and a cup mounted upon each shaft, adapted to engage said driver to rotatably lock the shaft upon which said parts are mounted and the driver together.

4. In a device of the kind described, a frame, a rotatable driver mounted upon said frame, and a shaft rotatably mounted jointly upon said frame and driver, in combination with a conical part and a cup mounted upon said shaft, each adapted to engage said driver to rotatably lock said shaft and driver together.

5. In a device of the kind described, a frame, a rotatable driver mounted upon said frame, and a plurality of shafts rotatably mounted concentrically with said driver, in combination with a conical part, and a longitudinally movable cup mounted upon each shaft, adapted to engage said driver to rotatably lock the shaft upon which said parts are mounted and the driver together.

6. In a device of the kind described, a frame, a rotatable driver mounted upon said frame, and a shaft rotatably mounted concentrically with said driver, in combination with a conical part and a cup mounted upon said shaft, each adapted to independently engage said driver to rotatably lock said shaft and driver together, and means for operating said conical part and separate means for operating said cup.

7. In a device of the kind described, a frame, a rotatable driver mounted upon said frame, and a shaft rotatably mounted concentrically with said driver, in combination with a conical part and a cup mounted upon said shaft, each adapted to engage said driver to rotatably lock said shaft and driver together, means engaging said shaft for controlling the operation of said conical part, and means engaging said cup to control the operation of the cup.

8. In a device of the kind described, a frame, a rotatable driver mounted upon said frame, and a shaft rotatably mounted concentrically with said driver, in combination with a conical part and a cup provided with a conical recess mounted upon said shaft, each adapted to engage said driver to rotatably lock said shaft and driver together, means for operating said conical part, separate means engaging said cup to operate the cup, and mechanism connecting said operating means for simultaneously actuating the same.

9. In a device of the kind described, a frame, a rotatable driver mounted upon said frame, and a shaft rotatably mounted jointly upon said frame and driver, concentrically with said driver, in combination with a conical part and a cup mounted upon said shaft, each adapted to engage said driver to rotatably lock said shaft and driver together.

10. In a device of the kind described, a frame, a rotatable driver mounted upon said frame and a shaft rotatably mounted jointly upon said frame and driver, concentrically with said driver, in combination with a conical part and a longitudinally movable cup mounted upon said shaft, each adapted to independently engage said driver to rotatably lock said shaft and driver together.

11. In a device of the kind described, a frame, a rotatable driver mounted upon said frame, and a shaft rotatably mounted jointly upon said frame and driver, concentrically with said driver, in combination with a conical part and a longitudinally movable cup provided with a conical recess mounted upon said shaft, each adapted to independently engage said driver to rotatably lock said shaft and driver together, and means for simultaneously operating said engaging mechanism.

12. In a device of the kind described, a frame, a rotatable driver mounted upon said frame, and a shaft rotatably mounted concentrically with said driver, in combination with a conical part and a longitudinally movable cup provided with a conical recess mounted upon said shaft, each adapted to independently engage said driver to rotatably lock said shaft and driver together, means for operating said conical part, separate means engaging said cup to operate the cup, and mechanism connecting said operating means for simultaneously actuating the same.

13. In a device of the kind described, a frame, a rotatable driver mounted upon said frame, and a shaft rotatably mounted concentrically with said driver, in combination with a conical part and a cup provided with a conical recess mounted upon said shaft, each adapted to independently engage said driver to rotatably lock said shaft and driver together, a pair of levers loosely mounted upon said frame, one for operating said conical part, and one for operating said cup, and means connecting said levers adapted to simultaneously operate the same.

14. In a device of the kind described, a frame, a rotatable driver mounted upon said frame, and a shaft rotatably mounted jointly upon said frame and driver, in combination with a conical part and a cup provided with a conical recess mounted upon said shaft, each adapted to engage said driver to rotatably lock said shaft and driver together.

In testimony whereof, I have hereunto signed my name in the presence of two subscribing witnesses.

EMIL R. KLEMM.

Witnesses:
BURTON U. HILLS,
CHARLES I. COBB.